United States Patent
Keski-Jaskari

(10) Patent No.: US 11,360,609 B2
(45) Date of Patent: Jun. 14, 2022

(54) PIEZOELECTRIC SENSING DEVICE

(71) Applicant: AITO BV, EJ Amsterdam (NL)

(72) Inventor: Turo Keski-Jaskari, Tuusula (FI)

(73) Assignee: AITO BV, Amsterdam (NL)

( * ) Notice: Subject to any disclaimer, the term of this patent is extended or adjusted under 35 U.S.C. 154(b) by 0 days.

(21) Appl. No.: 17/171,359

(22) Filed: Feb. 9, 2021

(65) Prior Publication Data
US 2021/0247860 A1    Aug. 12, 2021

(30) Foreign Application Priority Data
Feb. 12, 2020    (FI) .................... 20205146

(51) Int. Cl.
| | | |
|---|---|---|
| *G06F 3/043* | (2006.01) | |
| *G06F 3/041* | (2006.01) | |
| *G06F 3/01* | (2006.01) | |
| *H01L 41/04* | (2006.01) | |
| *H01L 41/09* | (2006.01) | |
| *H01L 41/113* | (2006.01) | |
| *H03K 17/96* | (2006.01) | |

(52) U.S. Cl.
CPC ............ *G06F 3/043* (2013.01); *G06F 3/0416* (2013.01); *G06F 3/016* (2013.01)

(58) Field of Classification Search
USPC ........................................ 345/177
See application file for complete search history.

(56) References Cited

U.S. PATENT DOCUMENTS

| | | | |
|---|---|---|---|
| 9,965,930 B1 | 5/2018 | Christensen | |
| 2008/0136786 A1* | 6/2008 | Lanfermann | G06F 3/041 345/173 |
| 2009/0146533 A1* | 6/2009 | Leskinen | H01L 41/1132 310/338 |
| 2011/0128250 A1* | 6/2011 | Murphy | G06F 3/0414 345/174 |

(Continued)

FOREIGN PATENT DOCUMENTS

JP    2006107140 A    4/2006

OTHER PUBLICATIONS

Extended European Search Report in European Patent Application No. EP 21156522.1, dated Jul. 1, 2021 (8 pages).

(Continued)

*Primary Examiner* — Chineyere D Wills-Burns
(74) *Attorney, Agent, or Firm* — Nixon Peabody LLP

(57) ABSTRACT

It is an object to provide an electronic device for sensing and/or for providing a haptic effect. According to an embodiment, a device comprises a touch surface; a piezoelectric transducer mechanically coupled to the touch surface; and a control circuitry electrically coupled to the piezoelectric transducer, configured to: obtain at least one parameter describing a reference response of the piezoelectric transducer; form a reference voltage curve based on the at least one parameter; drive the piezoelectric transducer with a driving voltage; measure a voltage curve over the piezoelectric transducer; compare the reference voltage curve and the measured voltage curve; and detect a touch on the touch surface based on the comparison. A device, a method, and a computer program product are provided.

17 Claims, 5 Drawing Sheets

(56) References Cited

U.S. PATENT DOCUMENTS

| | | | | |
|---|---|---|---|---|
| 2012/0126941 A1* | 5/2012 | Coggill | ............... | G06F 3/04886 340/5.54 |
| 2014/0197936 A1* | 7/2014 | Biggs | ................. | H01L 41/0986 340/407.1 |
| 2015/0091414 A1* | 4/2015 | Lonnberg | ................ | G06F 3/016 310/330 |
| 2015/0130730 A1* | 5/2015 | Harley | .................... | G06F 3/016 345/173 |
| 2015/0234526 A1* | 8/2015 | Chalubert | ........... | G06F 3/04166 345/177 |
| 2017/0214385 A1* | 7/2017 | Bhattacharjee | .... | H03H 9/14564 |
| 2019/0095045 A1* | 3/2019 | Khajeh | ................. | H01L 41/257 |
| 2019/0179472 A1* | 6/2019 | Keski-Jaskari | ..... | G06F 3/04166 |

OTHER PUBLICATIONS

Finnish Search Report from Finnish Patent Application No. FI-20205146 dated Sep. 22, 2020.
Keawboonchuay, C. et al., "Electrical Power Generation Characteristics of Piezoelectic Generator Under Quasi-static and Dynamic Stress Conditions," In: IEEE Transactions on Ultrasonics, Ferroelectrics, and Frequency Control. IEEE [online], Nov. 10, 2003, vol. 50, No. 10, pp. 1377-1382, [retrieved on Sep. 17, 2020]. Retrieved from <http://ieeexplore.ieee.org/document/1244755>, <DOI: 10.1109/TUFFC.2003.1244755> section II.B; Fig. 3.

\* cited by examiner

PIEZOELECTRIC SENSING DEVICE

CROSS-REFERENCE TO RELATED APPLICATIONS

This application claims the benefit of priority of Finnish Patent Application No. FI 20205146, filed Feb. 12, 2020 which is hereby incorporated by reference in its entirety.

TECHNICAL FIELD

The present disclosure relates to a device, and more particularly to an electronic device for sensing and/or for providing a haptic effect.

BACKGROUND

Piezoelectric transducers may be used to provide haptic effects for a user, to sense touch, or both. However, performing both functionalities using a single piezoelectric transducer may present various challenges. For example, the signal produced by the touch of a user may be difficult to detect if the piezoelectric transducer is driven with a driving voltage at the same time.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

It is an object to provide an electronic device for sensing and/or for providing a haptic effect. The foregoing and other objects are achieved by the features of the independent claims. Further implementation forms are apparent from the dependent claims, the description and the figures.

According to a first aspect, a device comprises: a touch surface; a piezoelectric transducer mechanically coupled to the touch surface; and a control circuitry electrically coupled to the piezoelectric transducer, configured to: obtain at least one parameter describing a reference response of the piezoelectric transducer; form a reference voltage curve based on the at least one parameter; drive the piezoelectric transducer with a driving voltage; measure a voltage curve over the piezoelectric transducer; compare the reference voltage curve and the measured voltage curve; and detect a touch on the touch surface based on the comparison. The device may, for example, be able to detect the touch on the touch surface even when driving the piezoelectric transducer with the driving voltage.

In an implementation form of the first aspect, the control circuitry is further configured to detect a temporal change property of the touch on the touch surface based on the comparison. The device may, for example, be able to detect whether a force applied by the touch is increasing or decreasing.

In a further implementation form of the first aspect, the at least one parameter comprises an RC time constant of the piezoelectric transducer. The device may, for example, be able to form the reference voltage curve using a single parameter.

In a further implementation form of the first aspect, the control circuitry is further configured to compare the reference voltage curve and the measured voltage curve by: calculating a difference between the reference voltage curve and the measured voltage curve. The device may, for example, be able to efficiently compare the reference voltage curve and the measured voltage curve.

In a further implementation form of the first aspect, the control circuitry is further configured to compare the reference voltage curve and the measured voltage curve by: subtracting the reference voltage curve from the measured voltage curve producing a difference voltage curve; and detecting the touch based on the difference voltage curve. The device may, for example, detect the touch even when driving the piezoelectric transducer.

In a further implementation form of the first aspect, the control circuitry is further configured to: calculate an integral of the difference voltage curve; and detect the touch based on the integral of the difference voltage curve. The device may, for example, be able to detect the touch efficiently.

In a further implementation form of the first aspect, the control circuitry is further configured to: calculate a vibrational amplitude of the difference voltage curve; and detect the touch based on the vibrational amplitude of the difference voltage curve. The device may, for example, be able to detect the touch efficiently using the vibration induced by an object.

In a further implementation form of the first aspect, the control circuitry is further configured to compare the reference voltage curve and the measured voltage curve by: detecting a saturation period of the reference voltage curve; detecting a saturation period of the measured voltage curve; and comparing the saturation period of the reference voltage curve and of the measured voltage curve. The device may, for example, be able to detect the touch efficiently even when saturation limits the detection of the signals.

In a further implementation form of the first aspect, the control circuitry is further configured to: drive the piezoelectric transducer using a test driving voltage; measure a response voltage curve caused by the test driving voltage over the piezoelectric transducer; and calculate the at least one parameter based on the response voltage curve. The device may, for example, update the at least one parameter. Thus, if the electrical and/or mechanical properties of the piezoelectric transducer change, the device may take these changes into account.

It is to be understood that the implementation forms of the first aspect described above may be used in combination with each other. Several of the implementation forms may be combined together to form a further implementation form.

According to second aspect, a method comprises: obtaining at least one parameter describing a reference response of a piezoelectric transducer; forming a reference voltage curve based on the at least one parameter; driving the piezoelectric transducer with a driving voltage; measuring a voltage curve over the piezoelectric transducer; comparing the reference voltage curve and the measured voltage curve; and detecting a touch on a touch surface based on the comparison.

In an implementation form of the second aspect, the detecting the touch on a touch surface based on the comparison comprises: detecting a temporal change property of the touch on the touch surface based on the comparison.

In a further implementation form of the second aspect, the comparing the reference voltage curve and the measured voltage curve comprises subtracting the reference voltage curve from the measured voltage curve producing a difference voltage curve; and the detecting a touch on a touch surface based on the comparison comprises detecting the touch based on the difference voltage curve.

In a further implementation form of the second aspect, the method further comprises: calculating an integral of the difference voltage curve; wherein the detecting a touch on a touch surface based on the comparison comprises detecting the touch based on the integral of the difference voltage curve.

In a further implementation form of the second aspect, the method further comprises: driving the piezoelectric transducer using a test driving voltage; measuring a response voltage curve caused by the test driving voltage over the piezoelectric transducer; and calculating the at least one parameter based on the response voltage curve.

It is to be understood that the implementation forms of the second aspect described above may be used in combination with each other. Several of the implementation forms may be combined together to form a further implementation form.

According to a third aspect, a computer program product is provided, comprising program code configured to perform a method according to the second aspect when the computer program is executed on a computing device.

Many of the attendant features will be more readily appreciated as they become better understood by reference to the following detailed description considered in connection with the accompanying drawings.

DESCRIPTION OF THE DRAWINGS

In the following, example embodiments are described in more detail with reference to the attached figures and drawings, in which.

In the following, like reference numerals are used to designate like parts in the accompanying drawings.

DETAILED DESCRIPTION

In the following description, reference is made to the accompanying drawings, which form part of the disclosure, and in which are shown, by way of illustration, specific aspects in which the present disclosure may be placed. It is understood that other aspects may be utilised, and structural or logical changes may be made without departing from the scope of the present disclosure. The following detailed description, therefore, is not to be taken in a limiting sense, as the scope of the present disclosure is defined be the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. On the other hand, for example, if a specific apparatus is described based on functional units, a corresponding method may include a step performing the described functionality, even if such step is not explicitly described or illustrated in the figures. Further, it is understood that the features of the various example aspects described herein may be combined with each other, unless specifically noted otherwise.

Figure 1:
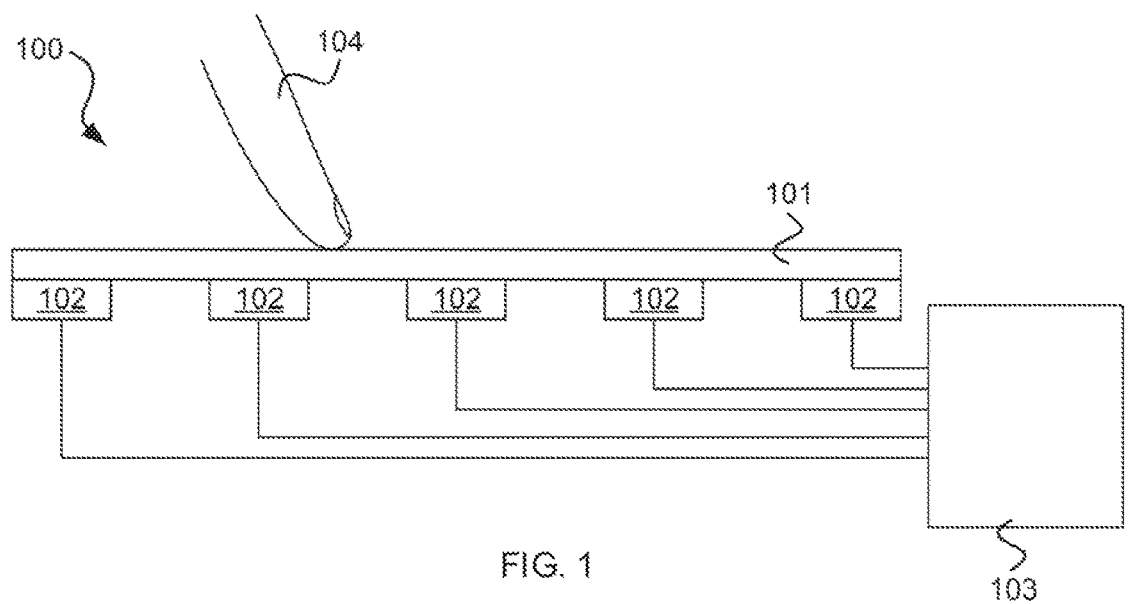
FIG. 1 illustrates a cross-sectional representation of a device according to an embodiment.

FIG. 1 illustrates a schematic representation of a cross section of a device 100 according to an embodiment.

The device 100 may comprise a touch surface 101.

The touch surface 101 may also be referred to as a layer, a surface layer, a touch interface surface, or a touch interface layer. The touch surface 101 may be part of a touch user interface. The touch surface 101 may be, for example, a part of a trackpad or a key/button of a laptop computer or a touch screen.

The touch surface 101 may comprise a first side and a second side. The first side may be at least partially unobstructed. A user may touch the first side with an object 104, such as a finger.

The device 100 may further comprise a piezoelectric transducer 102. The piezoelectric transducer 102 may be mechanically coupled to the touch surface 101.

Herein, two elements being mechanically coupled may indicate that there is a mechanical connection between the two elements. The two elements may be, for example, in contact with each other or the mechanical connection may be implemented via other elements. For example, the piezoelectric transducer 102 may be in contact with the touch surface 101 or there may be one or more other elements between the piezoelectric transducer 102 and the touch surface 101. Thus, when a force is applied to the touch surface 101 by an object 104 touching the touch surface 101, the force may be transferred to the piezoelectric transducer 102.

The device 100 may further comprise a control circuitry 103 electrically coupled to the piezoelectric transducer 102. The control circuitry 103 may be configured to obtain at least one parameter describing a reference response of the piezoelectric transducer 102.

The reference response may also be referred to as reference behaviour or similar. The reference response may describe how the piezoelectric transducer 102 responds when it is driven with a preconfigured signal/voltage, such as a preconfigured reference signal/voltage. The reference response may correspond to a time dependent voltage over the piezoelectric transducer 102 when the piezoelectric transducer 102 is driven with a preconfigured signal/voltage, such as a preconfigured reference signal/voltage.

The at least one parameter may correspond to a reference response of the piezoelectric transducer 102.

The at least one parameter may comprise, for example, an RC time constant of the piezoelectric transducer 102. Alternatively or additionally, the at least one parameter may comprise any other parameter describing the reference response of the piezoelectric transducer 102, such as resistance R of the piezoelectric transducer 102, capacitance C of the piezoelectric transducer 102, and/or at least one mechanical property of the piezoelectric transducer 102 and/or of the touch surface 101, such as stiffness of the touch surface 101 and/or stiffness of the piezoelectric transducer 102.

The control circuitry 103 may be further configured to form a reference voltage curve based on the at least one parameter.

For example, if the at least one parameter comprises an RC time constant of the piezoelectric transducer, the control circuitry 103 may form an RC voltage discharge curve of the piezoelectric transducer 102.

Alternatively or additionally, the at least one parameter may comprise a plurality of parameters. In such cases, the control circuitry 103 may be configured to form a more complex reference voltage curve.

The control circuitry 103 may be configured to generate the reference voltage curve based on the at least one parameter. The control circuitry 103 may be configured to synthesize the reference voltage curve based on the at least one parameter.

Herein, "voltage curve" may refer to a voltage that is a function of time. A voltage curve may be continuous or discrete. A voltage curve may be expressed using, for example, a mathematical expression that may be a function of time or using a plurality of discrete voltage samples.

The control circuitry 103 may further be configured to drive the piezoelectric transducer with a driving voltage. The driving voltage may also be referred to as a driving voltage curve.

The driving voltage may be a function of time. The driving voltage may comprise, for example, a voltage pulse. The voltage pulse may be, for example a substantially Gaussian voltage pulse.

The control circuitry 103 may further be configured to measure a voltage curve over the piezoelectric transducer. This may produce a measured voltage curve.

The control circuitry 103 may comprise at least one resistor electrically connected to the piezoelectric transducer 102. The at least one resistor may discharge the piezoelectric transducer 102. The control circuitry 103 may be configured to measure the voltage curve over the piezoelectric transducer 102 while the piezoelectric transducer 102 discharges via the at least one resistor.

The control circuitry 103 may further be configured to compare the reference voltage curve and the measured voltage curve. This may produce a comparison result. The control circuitry 103 may compare the reference voltage curve and the measured voltage curve by, for example, subtracting the reference voltage curve from the measured voltage curve or vice versa.

The control circuitry 103 may further be configured to detect a touch on the touch surface 101 based on the comparison.

The control circuitry 103 may be configured to detect a touch on the touch surface 101 based on the comparison result.

The piezoelectric transducer 102 may be arranged onto the second side of the surface 101. The device 100 may comprise a plurality of piezoelectric transducers 102. The disclosure herein may be applied for each piezoelectric transducer 102 in the plurality of piezoelectric transducers.

If the device 100 comprises a plurality of piezoelectric transducers 102, the control circuitry 103 may be configured to deduce the location of the object 104 on the touch surface 101 based on the force detected in each piezoelectric transducer 102. The control circuitry 103 may perform this using, for example, a weighted average or a similar procedure.

The piezoelectric transducers 102 may be next to the second side, in a close proximity of the second side or situated at a distance from the second side. Each piezoelectric transducer 102 in the plurality of piezoelectric transducers may be configured to convert a mechanical stress in the piezoelectric transducer 102 induced by a force exerted onto the first side of the touch surface 101 by an object 104 into a voltage. The mechanical stress may also be referred to as stress. The voltage may be referred to as electrical voltage, a stress induced voltage, or a corresponding voltage. The voltage may be proportional to the mechanical stress.

The piezoelectric transducer 102 may be configured to convert the mechanical stress into the voltage via the piezoelectric effect, also referred to as piezoelectricity. The object 104 may be, for example, a finger of a user, any other body part of a human, a stylus pen, or some other object held by a user. In the case that the object 104 is a finger, the user may be wearing gloves, and only the fabric of the glove may be in direct contact with the touch surface 101.

The voltage induced over the piezoelectric transducer 102, and therefore the measured voltage curve, may be proportional to the rate of change of the force/pressure applied by the object 104 to the touch surface 101.

The piezoelectric transducer 102 may also be configured to convert a voltage applied over the piezoelectric transducers into a mechanical stress via the piezoelectric effect. Thus, when a driving voltage is applied over a piezoelectric transducer 102, a haptic effect may be induced into the touch surface 101.

Although in the embodiment of FIG. 1, only one object 104 is illustrated, there may be a plurality of objects 104 touching the touch surface 101 at the same time. Any embodiment of the device 100 described herein may be configured to locate the position of each object of a plurality of objects 104 on the touch surface 101. The positioning of each object 104 may be performed as described herein.

Figure 2:
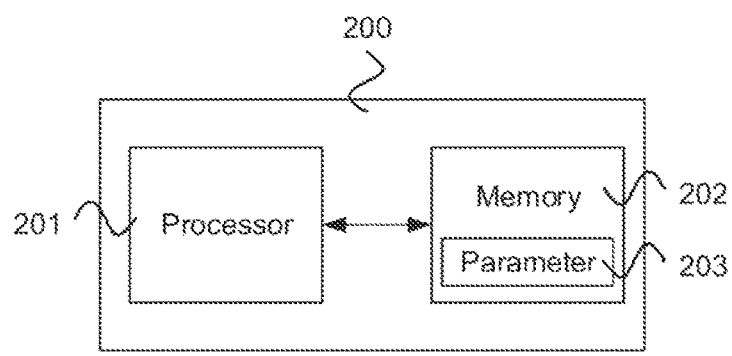
FIG. 2 illustrates a schematic representation of a computing unit according to an embodiment.

FIG. 2 illustrates a schematic representation of a computing unit 200 according to an embodiment. The control circuitry 103 may comprise the computing unit 200.

The computing unit 200 may comprise at least one processor 201. The at least one processor 201 may comprise, for example, one or more of various processing devices, such as a co-processor, a microprocessor, a digital signal processor (DSP), a processing circuitry with or without an accompanying DSP, or various other processing devices including integrated circuits such as, for example, an application specific integrated circuit (ASIC), a field programmable gate array (FPGA), a microprocessor unit (MCU), a hardware accelerator, a special-purpose computer chip, or the like.

The computing unit 200 may further comprise a memory 202. The memory may be configured to store, for example, computer programs and the like. The memory may comprise one or more volatile memory devices, one or more non-volatile memory devices, and/or a combination of one or more volatile memory devices and non-volatile memory devices. For example, the memory may be embodied as magnetic storage devices (such as hard disk drives, floppy disks, magnetic tapes, etc.), optical magnetic storage devices, and semiconductor memories (such as mask ROM, PROM (programmable ROM), EPROM (erasable PROM), flash ROM, RAM (random access memory), etc.).

When the computing unit 200 is configured to implement some functionality, some component and/or components of the computing unit 200, such as the at least one processor and/or the memory, may be configured to implement this functionality. Furthermore, when the at least one processor is configured to implement some functionality, this functionality may be implemented using program code comprised, for example, in the memory.

The memory 202 may comprise the at least one parameter 203.

The computing unit 200 may further comprise, for example, a boost converter circuit, a microprocessor, and other components used to interact with the piezoelectric transducers 102. The boost converter may provide a high voltage that may be needed to drive the piezoelectric transducers 102 in the case of haptic feedback.

When the control circuitry 103 is configured to perform a computational operation, the computing unit 200 may be configured to perform that computational operation. Such a computation operation may comprise, for example, obtaining at least one parameter, forming the reference voltage curve based on the at least one parameter, comparing the reference voltage curve and the measured voltage curve, and/or detecting a touch on the touch surface based on the comparison.

Figure 3:
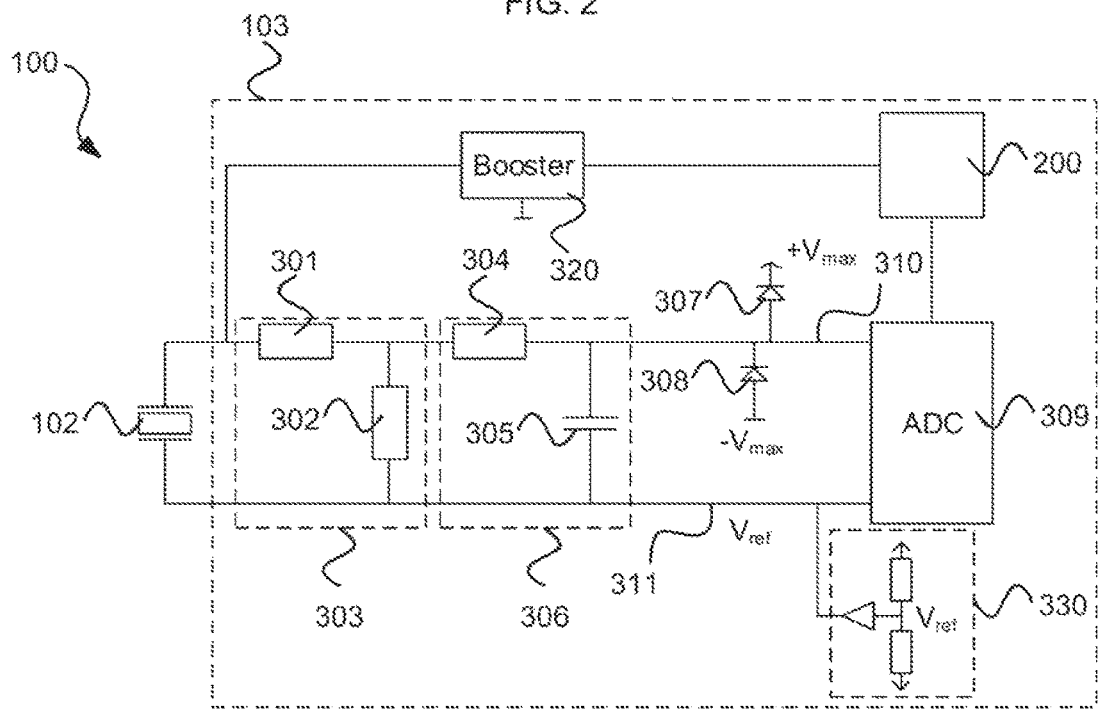
FIG. 3 illustrates a circuit diagram representation of a device according to an embodiment.

FIG. 3 illustrates a circuit diagram representation of a device 100 according to an embodiment.

Although some components of the device 100 are illustrated as parts of the control circuitry 103, this is not the only way in which the device 100 may be implemented and the control circuitry 103 does not need to be implemented in a single unit. Rather, the control circuitry 103 may refer to various components in the device 100 that are used to control the piezoelectric transducer 102.

The piezoelectric transducer 102 may be modelled as a capacitor. Other electrical/physical properties, such as resistance, inductance, hysteresis, and LC resonance, of the piezoelectric transducer 102 may also be modelled by adding corresponding electrical components to the model of the piezoelectric transducer 102. For example, a resistor may be added to model the resistive losses in the piezoelectric transducer 102. An inductor may be added to model the inductance of the piezoelectric transducer 102. In many cases the capacitive behaviour of the piezoelectric transducer 102 may be dominant, and therefore modelling the piezoelectric transducer 102 as a single capacitor may be sufficient.

The device 100 may comprise a voltage divider 303 comprising a first 301 and a second resistor 302.

The device 100 may further comprise a low-pass filter 306 comprising a third resistor 304 and a capacitor 305. The low-pass filter 306 may be configured to filter out unwanted frequency components.

A cut-off frequency of the low-pass filter 306 may be, for example, in the range 50-300 hertz (Hz), or in any subrange of this, such as 50-200 Hz, 50-150 Hz, or 70-130 Hz.

The device 100 may further comprise a first 307 and a second diode 308.

The device 100 may further comprise an analogue to digital converter (ADC) 309. The control circuitry 103 may for example comprise the ADC 309.

The first 307 and second diode 308 may limit the voltage fed into the ADC 309. The first diode 307 may be coupled between a first conductor 310 and a maximum voltage $V_{max}$. The second diode 308 may be coupled between the first conductor 310 and a minimum voltage $-V_{max}$. The first conductor 310 may be electrically coupled to the ADC 309. Thus, the voltage fed into the ADC 309 via the first conductor 310 may be limited between $-V_{max}$ and $+V_{max}$. The dynamic range of the ADC 309 may be $2V_{max}$.

The control circuitry 103 may further comprise a reference voltage circuit 330. The reference voltage circuit 330 may provide a reference voltage $V_{ref}$.

The ADC 309 may be electrically coupled to a second conductor 311. The second conductor 311 may be at the reference voltage $V_{ref}$. The reference voltage may correspond to, for example, a ground voltage, $\frac{1}{2}V_{dd}$, or similar. $V_{dd}$ may be a power supply voltage. The ADC 309 may be configured to measure a voltage between the first conductor 310 and the second conductor 311.

$V_{ref}$ may comprise any practical voltage within the dynamic range of the ADC 309, which allows reading of piezo voltages above and below $V_{ref}$. $V_{ref}$ does not need to be in the centre of the dynamic range of the ADC 309, nor does the response above/below need to be linear, or with similar dynamics above/below. However, there may need to be a capability to measure into both directions, differentially in relation to $V_{ref}$.

Alternatively, $V_{ref}$ may correspond to a ground voltage. However, then the ADC 309 may need to be capable of reading also negative voltages, which may increase manufacturing costs of the device 100.

The device 100 may further comprise other components not illustrated in the figures.

The device 100 may comprise a multiplexer. A plurality of piezoelectric transducer 102 may be coupled the ADC 309 via the multiplexer.

The device 100 may further comprise a boost converter 320. The boost converter 320 may be configured to drive the piezoelectric transducer 102. When the control circuitry 103 is configured to drive the piezoelectric transducer 102, the computing unit 200 may be electrically coupled to a boost converter 320 and the computing unit 200 may control the boost converter 320 so that the boost converter 320 provides the driving voltage/current for the piezoelectric transducer 102. The boost converter 320 may drive a plurality of piezoelectric transducers 102 via a multiplexer.

In the device 100, the boost converter 320 and the sensing circuitry may be always connected to the piezoelectric transducer 102 without the need to switch between sensing and haptic driving. This may enable high responsiveness and improved usability.

When the device 100 is idle, each terminal of the piezoelectric transducer 102 may be at a reference voltage $V_{ref}$. The reference voltage may be selected according to the sensing system at hand. In the idle state, this voltage may remain substantially constant. Thus, there may be no voltage over the first resistor 301 and/or the second resistor 302.

The terminal of the piezoelectric transducer 102 connected to the first resistor 301 may be referred to as a measuring terminal. The terminal of the piezoelectric transducer 102 connected to the second conductor 311 may be referred to as a reference terminal.

Whenever an object 104 touches the touch surface 101 or a voltage pulse generates an electric potential over the piezoelectric transducer 102, the potential of the higher impedance measuring terminal of the piezoelectric transducer 102 increases in relation to the more steady, lower impedance, reference terminal, thus introducing a voltage difference between the terminals, which the control circuitry 103 can measure using the ADC 309.

The potential difference can introduce a current through first resistor 301 and the second resistor 302, and the current discharges the electric charge in piezoelectric transducer 102. This can be detected by the control circuitry 103 as a voltage over the second resistor 302. The voltage may comprise a RC discharge curve due to the resistance of the piezoelectric transducer 102 and of the first 301 and the second resistor 302 and due to the capacitance of the piezoelectric transducer 102.

The resistance of the first 301 and second 302 resistor may dominate the internal resistance of the piezoelectric transducer 102. Resistance of the first 301 and second 302 resistor may be chosen so that they produce a reasonable decay rate of the voltage over the piezoelectric transducer 102 for human interface purposes.

The device 100 may comprise a computing unit 200. The control circuitry 103 may comprise the computing unit 200. The computing unit 200 may be electrically coupled to the boost converter 320 and/or to the ADC 309. The computing unit 200 may obtain voltage measurement samples via the ADC 309. The computing unit 200 may also control the boost converter 320. When the boost converter 320 is configured to perform some operation, the computing unit 200 may be configured to perform that operation by controlling the boost converter 320.

Figure 4:
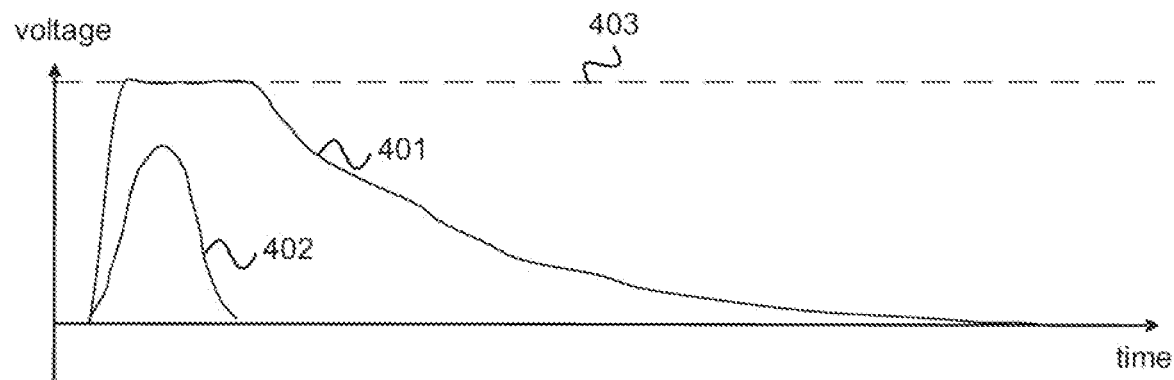
FIG. 4 illustrates a schematic representation of a voltage pulse used to drive a piezoelectric transducer and a reference voltage curve according to an embodiment.

FIG. 4 illustrates a schematic representation of a driving voltage 402 used to drive a piezoelectric transducer 102 and a reference voltage curve 401 according to an embodiment.

The scale of the driving voltage 402 and of the reference voltage curve 401 may not be the same. For example, the amplitude of the driving voltage 402 may be in the range 50-500 volts (V), or in any subrange of this, such as 50-300 V, 100-300 V, or 150-250 V. Meanwhile, the maximum of the reference voltage curve 401 may be limited by a saturation voltage level 403. The saturation voltage level 403 may be less than 10 V, for example 3.3 V.

The saturation voltage level 403 may be due to, for example, the limited dynamic range of the ADC 309.

The reference voltage curve 401 may correspond to the driving voltage 402. When the piezoelectric transducer 102 is driven with the driving voltage 402, the reference voltage curve 401 may correspond to the voltage over the piezoelectric transducer 102 when the piezoelectric transducer 102 is not touched by an object 104.

The control circuitry 103 may form the reference voltage curve 401 based on the at least one parameter 203. For example, when the at least one parameter 203 comprises an RC constant r of the piezoelectric transducer 102, the temporal behaviour of the reference voltage curve 401 may follow:

$$V_{ref}(t) = V_0\left(1 - e^{-\frac{t}{\tau}}\right),$$

where t is time, $V_0$ may be some maximum voltage at time instant t=0 and $\tau$=RC, where R may be the resistance of the piezoelectric transducer 102 and C may be the capacitance of the piezoelectric transducer 102. The resistance R may also comprise the resistance of the first 301 and/or second resistor 302.

In a typical usage scenario, r may be, for example, 5-10 milliseconds (ms).

Due to the limited dynamic range of the ADC 309, the reference voltage curve 401 may saturate as illustrated in the embodiment of FIG. 4. Thus, the reference voltage curve 401 may follow the behaviour described above only when the reference voltage curve 401 is not saturated.

It should be appreciated that components other than the piezoelectric transducer 102 may affect the reference voltage curve and/or the at least one parameter. For example, some components may comprise capacitance which may affect the reference voltage curve 401 and/or the at least one parameter 203. Thus, the at least one parameter 203 may comprise an RC time constant of a circuit comprising the piezoelectric transducer 102.

Figure 5:
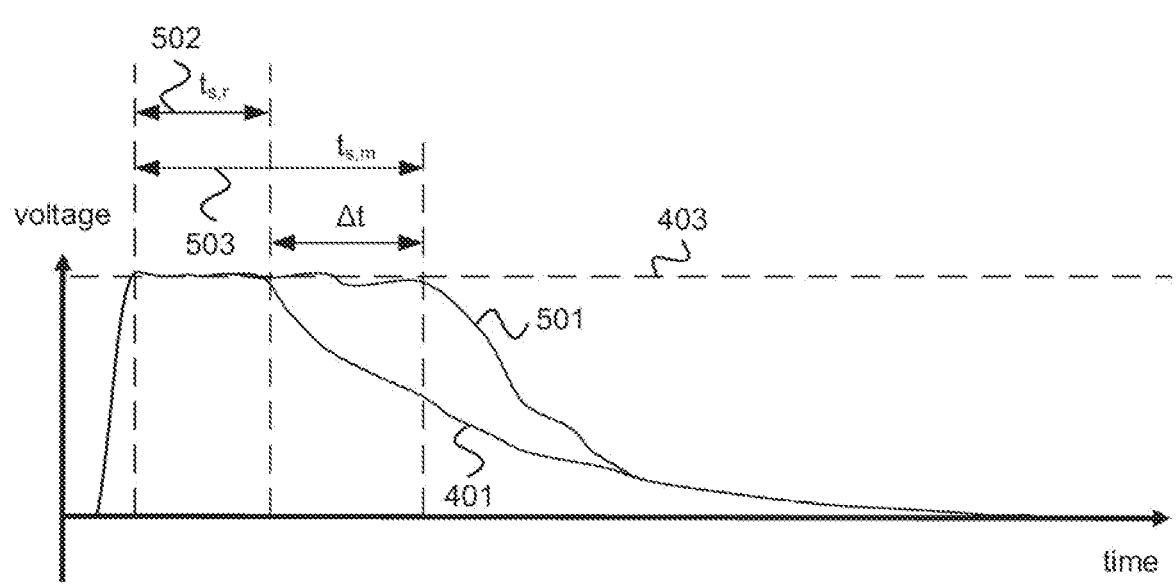
FIG. 5 illustrates a schematic representation of a measured voltage curve over a piezoelectric transducer according to an embodiment.

FIG. 5 illustrates a schematic representation of a measured voltage curve 501 over a piezoelectric transducer 102 according to an embodiment.

The measured voltage curve 501 presented in the embodiment of FIG. 5 may correspond to a situation when an object 104 touching the touch surface 101 is reducing the pressing force. This may be observed as a difference between the reference voltage curve 401 and the measured voltage curve 501. Due to the reducing force, the value of the measured voltage curve 501 is greater than the value of the reference voltage curve 401 when the force is reducing.

It should be appreciated that the discussion herein may assume that the piezoelectric transducer 102 is reverse-polarised. If the piezoelectric transducer 102 is not reverse-polarised, the situation presented in the embodiment of FIG. 5 may correspond to a situation where pressing force is increased.

The control circuitry 103 may further be configured to compare the reference voltage curve 401 and the measured voltage curve 501 by: detecting a saturation period 502 of the reference voltage curve 402, detecting a saturation period 503 of the measured voltage curve 501; and comparing the saturation period of the reference voltage curve 401 and of the measured voltage curve 501.

Herein, "saturation period" may refer to the length of the time interval that the voltage curve in question is in saturation. A voltage curve may be in saturation when the value of the voltage curve is greater or equal to the saturation voltage level 403.

For example, the saturation period of the reference voltage curve 401 may refer to the length of the time interval $t_{s,r}$ 502 illustrated in the embodiment of FIG. 5. Similarly, the saturation period of the measured voltage curve 501 may refer to the length of the time interval $t_{s,m}$ 503 illustrated in the embodiment of FIG. 5.

The control circuitry 103 may calculate, for example, a time difference $\Delta t$ between $t_{s,r}$ 502 and $t_{s,m}$ 503:

$$\Delta t = t_{s,m} - t_{s,r}.$$

If $\Delta t$ is positive, the measured voltage curve 501 is in saturation for a longer period of time than the reference voltage curve 401. An example of such a situation is illustrated in the embodiment of FIG. 5. This may correspond to a situation where the object 104 touching the touch surface 101 is reducing the pressing force.

On the other hand, if $\Delta t$ is negative, the measured voltage curve 501 is in saturation for a shorter period of time than the reference voltage curve 401. This may correspond to a situation where the object 104 touching the touch surface 101 is increasing the pressing force.

Figure 6:
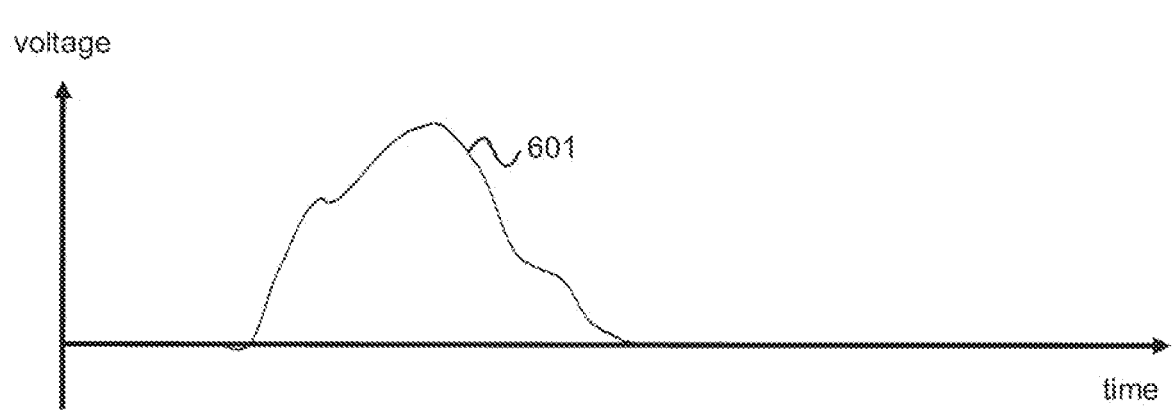
FIG. 6 illustrates a schematic representation of a difference voltage curve according to an embodiment.

FIG. 6 illustrates a schematic representation of a difference voltage curve 601 according to an embodiment.

The control circuitry 103 may be further configured to compare the reference voltage curve 401 and the measured voltage curve 501 by calculating a difference between the reference voltage 401 curve and the measured voltage curve 501.

The control circuitry 103 may be further configured to compare the reference voltage curve 401 and the measured voltage curve 501 by subtracting the reference voltage curve 401 from the measured voltage curve 501 producing a difference voltage curve 601; and detecting the touch based on the difference voltage curve 601.

The difference voltage curve $V_{diff}(t)$ 601 may be obtained by, for example, subtracting the reference voltage curve $V_{ref}(t)$ from the measured voltage curve $V_{meas}(t)$:

$$V_{diff}(t)=V_{meas}(t)-V_{ref}(t).$$

For example, the difference voltage curve illustrated in FIG. 6 may be obtained by subtracting the reference voltage curve 401 from the measured voltage curve 501 presented in FIG. 5.

The control circuitry 103 may be configured to detect sign/polarity of the difference voltage curve $V_{diff}(t)$. For example, in the case of the difference voltage curve 601 presented in FIG. 6, the control circuitry 103 may be configured to detect that the difference voltage curve 601 is dominantly positive.

The control circuitry 103 may be configured to detect a temporal change property of the touch based on the sign/polarity of the difference voltage curve $V_{diff}(t)$. For example, in the case of the difference voltage curve 601 presented in FIG. 6, the control circuitry 103 may be configured to detect that the force applied by the touch is decreasing.

The control circuitry 103 may be further configured to detect a temporal change property of the touch on the touch surface 101 based on the comparison.

A temporal change property of the touch on the touch surface 101 may refer to any property of the touch changing in time. For example, the control circuitry 103 may be configured to detect whether the force/pressure applied by the touch is increasing, decreasing, or remaining constant.

The control circuitry 103 may be further configured to calculate an integral of the difference voltage curve and detect the touch based on the integral of the difference voltage curve.

The control circuitry 103 may be configured to calculate, for example, the following integral:

$$I=\int_{t_1}^{t_2} V_{diff}(t)dt.$$

$t_1$ may be the time instant at which the device 100 starts to drive the piezoelectric transducer with the driving voltage. $t_2$ may be a preconfigured time instant after $t_1$.

Based on the result of the integral I, the control circuitry 103 may deduce whether an object is touching the touch surface 101 or not. For example, in the case of the embodiment of FIG. 6, $V_{diff}(t)$ is mostly positive. Thus, the result of the integral is positive, and control circuitry 103 can deduce that the object may be touching the touch surface 101 with a decreasing force.

The control circuitry 103 may approximate the integral presented above by summing samples of the difference voltage curve $V_{diff}$:

$$I \approx \frac{T}{N}\sum_{i=1}^{N} V_{diff}[i],$$

where $V_{diff}[i]$ may refer to the ith sample of $V_{diff}$, N may refer to the total number of samples, and T may be the length of the time period during which the samples were taken, for example $T=t_2-t_1$.

Alternatively, the control circuitry 103 may use other methods to evaluate the value of the integral I.

The control circuitry 103 may be configured to detect the touch on the touch surface 101 in response to the integral I reaching a preconfigured threshold value.

The time resolution TIN may be, for example, less than 1 ms.

T and/or N may comprise preconfigured values. Alternatively or additionally, the control circuitry 103 may be configured to sample the difference voltage curve until I reaches some preconfigured threshold value. In response to the preconfigured value being reached, the control circuitry 103 may detect the touch on the touch surface 101.

According to an embodiment, the control circuitry 103 is further configured to calculate a vibrational amplitude of the difference voltage curve and detect the touch based on the vibrational amplitude of the difference voltage curve.

When an object 104 touches the touch surface 101, the object 104 may introduce a vibration into the touch surface 101. This vibration may be detected via the piezoelectric transducer 102.

The control circuitry 103 may calculate an average difference voltage $V_{diff,ave}$ using, for example:

$$V_{diff,ave} = \frac{1}{N}\sum_{i} V_{diff}[i],$$

where N is the number of samples used for calculating the average.

For each sample $V_{diff}[i]$, the computing device 200 may calculate a vibration amplitude $\Delta_i$ using, for example:

$$\Delta_i=|V_{diff}[i]-V_{diff,ave}|.$$

The control circuitry 103 may calculate an average vibration amplitude $A_{ave}$ using, for example:

$$A_{ave} = \frac{1}{N}\sum_{i} A_i,$$

or $$A_{ave} = \frac{1}{N}\sum_{i} A_i^2.$$

The average vibration amplitude $A_{ave}$ may quantify the amount of vibration in the piezoelectric transducer 102. The vibrational amplitude of the difference voltage may comprise the average vibration amplitude $A_{ave}$.

Since the amount of vibration in an element 102 may be inversely proportional to the distance between the piezoelectric transducer 102 and the object 104, the computing unit 200 may use the vibrational component of each piezoelectric transducer 102 to calculate/estimate the position of the object 104 on the surface 101.

The control circuitry 103 may, for example, compare the vibrational amplitude of the difference voltage to a preconfigured threshold. If the vibrational amplitude of the difference voltage is greater than the preconfigured threshold, the control circuitry 103 may deduce that an object 104 is touching the touch surface 101.

Figure 7:
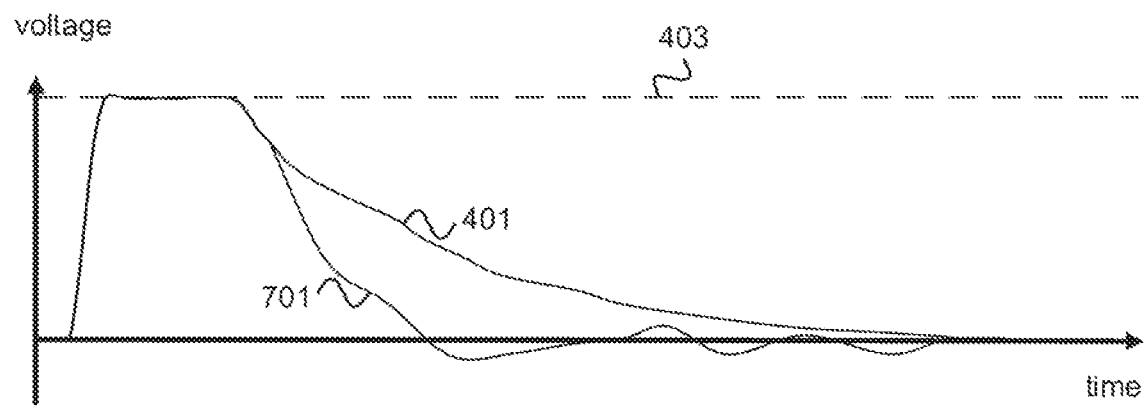
FIG. 7 illustrates a schematic representation of a measured voltage curve over a piezoelectric transducer according to an embodiment.

FIG. 7 illustrates a schematic representation of a measured voltage curve 701 over a piezoelectric transducer 102 according to an embodiment.

The measured voltage curve 701 presented in the embodiment of FIG. 7 may correspond to a situation where an object 104 touching the touch surface 101 is increasing the pressing force. This may be observed as a difference between the reference voltage curve 401 and the measured voltage curve 701. Due to the increasing force, the value of the measured voltage curve 701 is smaller than the value of the reference voltage curve 401 when the force is increasing.

Figure 8:
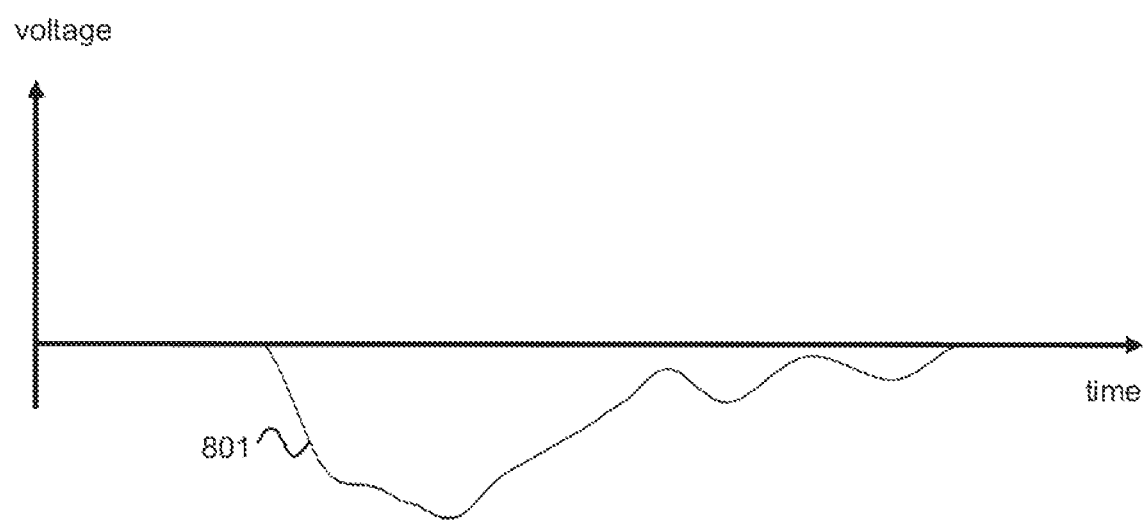
FIG. 8 illustrates a schematic representation of a difference voltage curve according to an embodiment.

FIG. 8 illustrates a schematic representation of a difference voltage curve 801 according to an embodiment.

The difference voltage curve 801 illustrated in FIG. 8 may be obtained by subtracting the reference voltage curve 401 from the measured voltage curve 701 presented in FIG. 7.

The control circuitry 103 may be configured to detect sign/polarity of the difference voltage curve $V_{diff}(t)$. For example, in the case of the difference voltage curve 801 presented in FIG. 8, the control circuitry 103 may be configured to detect that the difference voltage curve 801 is dominantly negative.

The control circuitry 103 may be configured to detect a temporal change property of the touch based on the sign/polarity of the difference voltage curve $V_{diff}(t)$. For example, in the case of the difference voltage curve 801 presented in FIG. 8, the control circuitry 103 may be configured to detect that the force/pressure applied by the touch is increasing.

Figure 9:
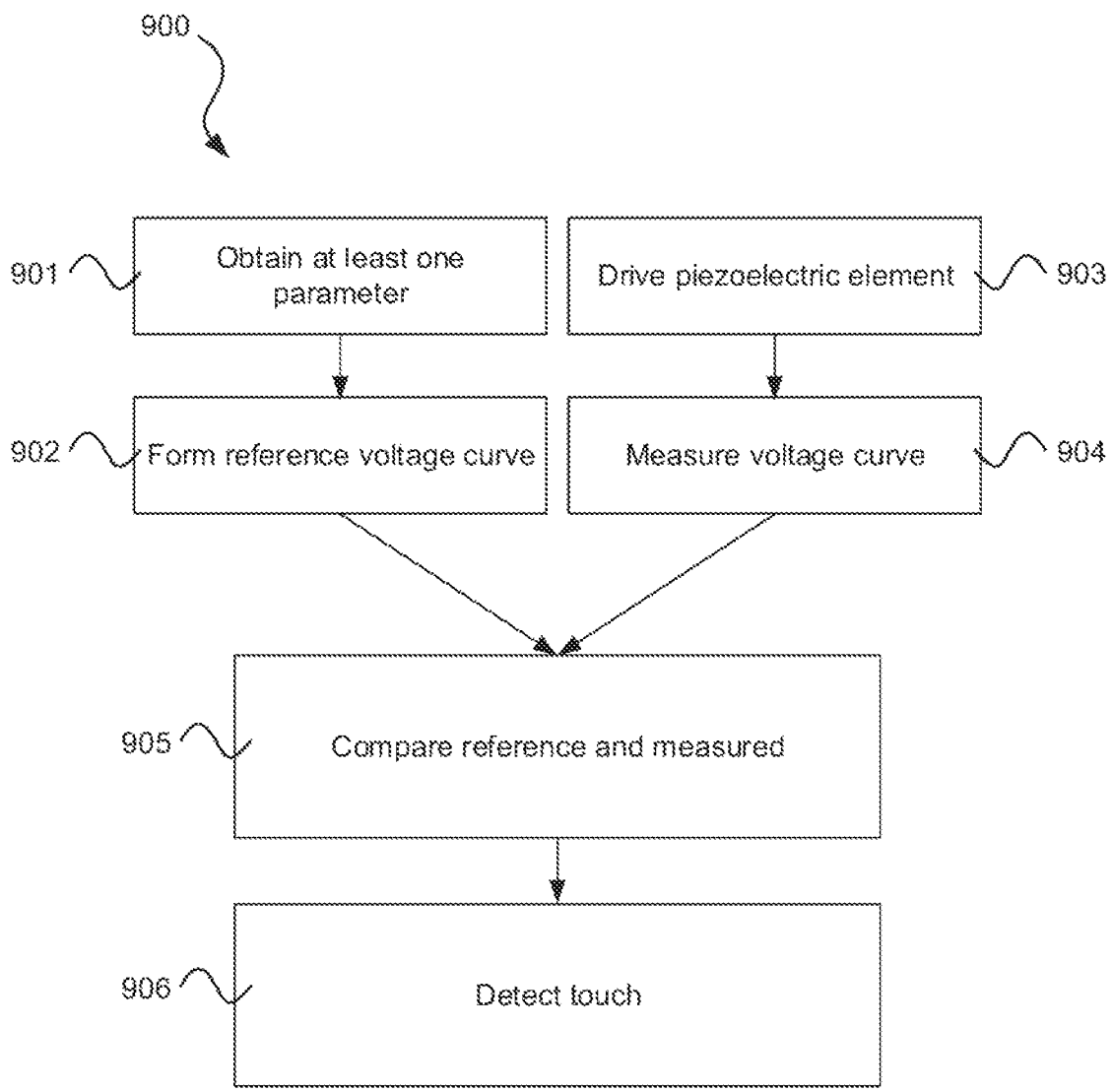
FIG. 9 illustrates a flow chart representation of a method according to an embodiment.

FIG. 9 illustrates a flow chart representation of a method according to an embodiment.

According to an embodiment, the method 900 comprises obtaining 901 at least one parameter describing a reference response of a piezoelectric transducer.

The method 900 may further comprise forming 902 a reference voltage curve based on the at least one parameter.

The method 900 may further comprise driving 903 the piezoelectric transducer with a driving voltage.

The method 900 may further comprise measuring 904 a voltage curve over the piezoelectric transducer.

The method 900 may further comprise comparing 905 the reference voltage curve and the measured voltage curve.

The method 900 may further comprise detecting 906 a touch on a touch surface based on the comparison.

Figure 10:
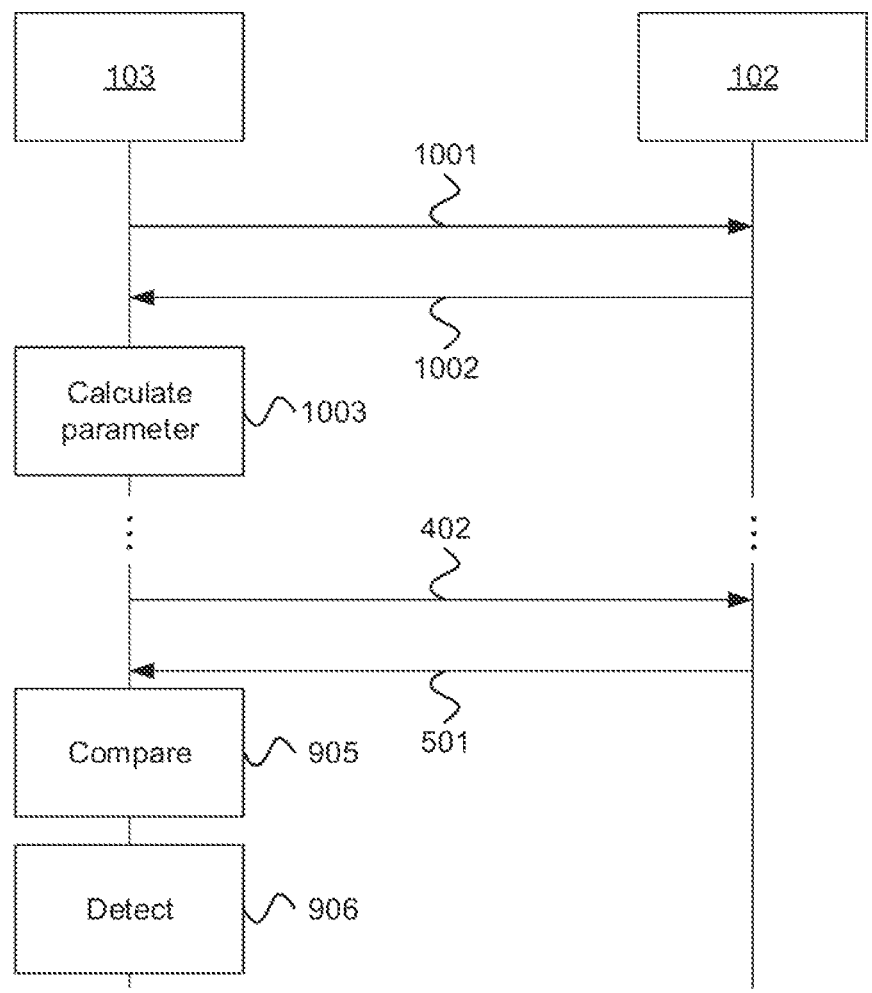
FIG. 10 illustrates a flow diagram representation of voltages used by the control circuitry according to an embodiment.

FIG. 10 illustrates a flow diagram representation of voltages used by the control circuitry 103 according to an embodiment.

The control circuitry 103 may further be configured to drive the piezoelectric transducer 102 using a test driving voltage 1001.

The test driving voltage 1001 may be similar to the driving voltage 402. The test driving voltage 1001 may comprise, for example, any preconfigured voltage curve suitable for testing the electrical and/or mechanical properties of the piezoelectric transducer 102.

The control circuitry 103 may be configured to drive the piezoelectric transducer 102 with the test driving voltage 1001 when there is no external force applied by an object 104 to the touch surface 101.

The control circuitry 103 may further be configured to measure a response voltage curve 1002 caused by the test driving voltage 1001 over the piezoelectric transducer 102.

Since the control circuitry 103 may be configured to drive the piezoelectric transducer 102 with the test driving voltage 1001 when there is no external force applied by and object 104 to the touch surface 101, the response voltage curve 1002 may correspond to the reference voltage curve 402. Thus, the control circuitry 103 may obtain the reference voltage 402 curve by measuring the response voltage curve 1002.

The control circuitry 103 may further be configured to calculate 1003 the at least one parameter 203 based on the response voltage curve 1002.

The control circuitry 103 may further be configured to store the at least one parameter 203. The control circuitry 103 may store the at least one parameter 203 into, for example, the memory 202.

The control circuitry 103 may, for example, estimate the RC time constant of the piezoelectric transducer 102 based on the response voltage curve 1002. The control circuitry 103 may use, for example, curve fitting and/or other computational procedures to obtain the at least one parameter 203 from the response voltage curve 1002.

The control circuitry 103 may perform the aforementioned operations for calculating the at least one parameter 203, for example, periodically. Since the electrical and/or mechanical properties of the piezoelectric transducer 102 may change over time, the control circuitry 103 may this way update the at least one parameter 203 to correspond to the current properties of the piezoelectric transducer 102. Thus, the reference voltage curve 401 formed based on the at least one parameter 203 may more accurately describe the reference behaviour of the piezoelectric transducer 102.

The control circuitry 103 may then obtain the at least one parameter 203, form the reference voltage curve 401 based on the at least one parameter 203, drive the piezoelectric transducer with a driving voltage 402, measure a voltage curve 501 over the piezoelectric transducer 102, compare the reference voltage curve 401 and the measured voltage curve 501 and detect a touch on the touch surface 101 based on the comparison as described herein.

Any range or device value given herein may be extended or altered without losing the effect sought. Also any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the embodiments described above may be combined with aspects of any of the other embodiments described to form further embodiments without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A device, comprising:
a touch surface;
a piezoelectric transducer mechanically coupled to the touch surface; and
a control circuitry electrically coupled to the piezoelectric transducer, configured to:
obtain at least one parameter describing a reference response of the piezoelectric transducer;
form a reference voltage curve based on the at least one parameter;
drive the piezoelectric transducer with a driving voltage;
measure a voltage curve over the piezoelectric transducer after driving the piezoelectric transducer with the driving voltage;
compare the reference voltage curve and the measured voltage curve; and
detect a touch on the touch surface based on the comparison.

2. The device according to claim 1, wherein the control circuitry is further configured to:
detect a temporal change property of the touch on the touch surface based on the comparison.

3. The device according to claim 1, wherein the at least one parameter comprises an RC time constant of the piezoelectric transducer.

4. The device according to claim 1, wherein the control circuitry is further configured to compare the reference voltage curve and the measured voltage curve by calculating a difference between the reference voltage curve and the measured voltage curve.

5. The device according to claim 1, wherein the control circuitry is further configured to compare the reference voltage curve and the measured voltage curve by:
subtracting the reference voltage curve from the measured voltage curve producing a difference voltage curve; and
detecting the touch based on the difference voltage curve.

6. The device according to claim 5, wherein the control circuitry is further configured to:
calculate an integral of the difference voltage curve; and
detect the touch based on the integral of the difference voltage curve.

7. The device according to claim 5, wherein the control circuitry is further configured to:
calculate a vibrational amplitude of the difference voltage curve; and
detect the touch based on the vibrational amplitude of the difference voltage curve.

8. The device according to claim 1, wherein the control circuitry is further configured to compare the reference voltage curve and the measured voltage curve by:
detecting a saturation period of the reference voltage curve;
detecting a saturation period of the measured voltage curve; and
comparing the saturation period of the reference voltage curve and of the measured voltage curve.

9. The device according to claim 1, wherein the control circuitry is further configured to:
drive the piezoelectric transducer using a test driving voltage;
measure a response voltage curve caused by the test driving voltage over the piezoelectric transducer; and
calculate the at least one parameter based on the response voltage curve.

10. The device according to claim 1, wherein the reference response of the piezoelectric transducer occurs when the piezoelectric transducer is driven by a predetermined voltage and no touch is applied to the touch surface.

11. A method, comprising:
obtaining at least one parameter describing a reference response of a piezoelectric transducer;
forming a reference voltage curve based on the at least one parameter;
driving the piezoelectric transducer with a driving voltage;
measuring a voltage curve over the piezoelectric transducer after driving the piezoelectric transducer with a driving voltage;
comparing the reference voltage curve and the measured voltage curve; and
detecting a touch on a touch surface based on the comparison.

12. The method according to claim 11, wherein the detecting the touch on a touch surface based on the comparison comprises:
detecting a temporal change property of the touch on the touch surface based on the comparison.

13. The method according to claim 11, wherein the comparing the reference voltage curve and the measured voltage curve comprises subtracting the reference voltage curve from the measured voltage curve producing a difference voltage curve; and the detecting a touch on a touch surface based on the comparison comprises detecting the touch based on the difference voltage curve.

14. The method according to claim 13, further comprising:
calculating an integral of the difference voltage curve;
wherein the detecting a touch on a touch surface based on the comparison comprises detecting the touch based on the integral of the difference voltage curve.

15. The method according to claim 11, further comprising:
driving the piezoelectric transducer using a test driving voltage;
measuring a response voltage curve caused by the test driving voltage over the piezoelectric transducer; and
calculating the at least one parameter based on the response voltage curve.

16. A non-transitory, machine readable medium having stored thereon instructions, which, when executed by at least one machine processor, cause the at least one machine processor to carry out the method according to claim 11.

17. The method according to claim 11, wherein the reference response of the piezoelectric transducer occurs when the piezoelectric transducer is driven by a predetermined voltage and no touch is applied to the touch surface.

* * * * *